Feb. 5, 1957  E. BLOMGREN ET AL  2,780,601
IMPROVED CHEMICAL REAGENT FOR THE QUANTITATIVE
DETERMINATION OF WATER
Filed Dec. 9, 1952
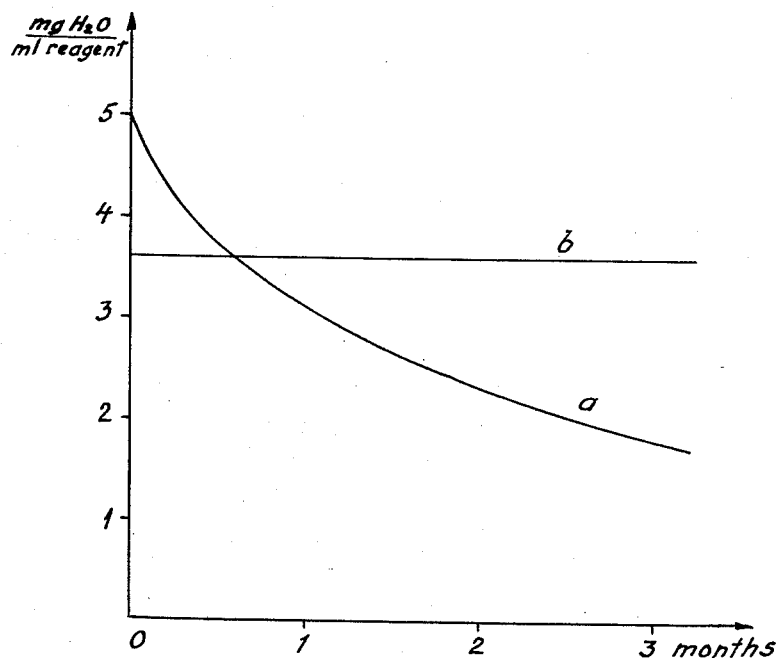
Inventors
Hans Jenner
E. Blomgren
By Henry C. Parker
Atty.

United States Patent Office 2,780,601
Patented Feb. 5, 1957

2,780,601

IMPROVED CHEMICAL REAGENT FOR THE QUANTITATIVE DETERMINATION OF WATER

Erik Blomgren and Hans Jenner, Stockholm, Sweden, assignors to Aktiebolaget Pharmacia, Uppsala, Sweden, a Swedish company Application December 9, 1952, Serial No. 325,006

3 Claims. (Cl. 252—408)

In recent years chemical reagents have come into use for the determination of water and moisture in various materials. These reagents contain as characteristic constituents one or more active substances which when brought into contact with water react with the latter in a definite (stoichiometric) ratio. Moreover, the reagents frequently contain a solvent which reduces the concentrations of the active substances in the reagent to suitable values, and also one or more substances which facilitate or accelerate the reaction of the active substances with water. When performing a volumetric determination, the reagent is added to the sample which is usually dissolved or suspended in an inert solvent, until the quantity of water in the sample has been exactly consumed by the amount of active substances present in the volume of the reagent added. The equivalence point is hereby indicated visually or electrometrically. Provided that the titre of the reagent has previously been determined by means of a known quantity of water, the water content in the sample is thus obtained.

The most common reagent of the said type is the so-called Karl Fischer reagent. The active substances of this reagent consist of sulphur dioxide and free iodine which are dissolved in methanol, pyridine being added to the solution. When the reagent comes into contact with water the sulphur dioxide and iodine react with the water in a definite ratio forming iodide and sulphate. This reaction is accelerated by the presence of pyridine.

The reagents hitherto employed for determining water suffer from unsatisfactory stability. Even when a reagent is stored so that it cannot absorb any moisture from the surroundings the titre of the reagent decreases in the course of time. This decrease of the titre has proved to be due to the spontaneous decomposition of the active substances, or to the reaction between the active substances themselves, or between the active substances and the substances present in the reagent to facilitate the reaction with water or finally to a combination of two or more of these reactions. In addition to a need for frequent restandardization, the progressive decrease of the titre introduces a general uncertainty in the determinations, and has therefore been regarded as the most serious limitation of the chemical methods for determining water. At present this disadvantage renders the use of the chemical methods for determining water difficult or prevents their use entirely in many cases where these methods could otherwise be employed with advantage.

The present invention eliminates the aforesaid disadvantages inasmuch as it relates to a chemical reagent for determining water whose titre does not change with time. The main object of the invention is to provide a reagent which, apart from the above-mentioned active substances and the solvent and the substances which facilitate the reaction with water, contains one or more further substances which influence the decomposition of the active substances or their reaction with one another and/or with the said solvent and/or with said substances added for facilitating the reaction with water. Said additional substances are hereby of such a nature and their concentrations in the reagent have such values that the spontaneous decrease in titre which would otherwise take place in the reagent is partly or entirely prevented and the reagent obtains a titre which remains substantially unchanged in the course of time. The invention further relates to a method for the preparation of such reagents as well as a method for determining water which is based upon the above-mentioned process for preventing the spontaneous decrease of the titre of the reagent.

The invention will now be described in greater detail. For the sake of simplicity it is assumed that the reagent contains only two active substances. It will be readily appreciated, however, that the description can be applied in principle equally well to any reagent which contains from one up to any desired number of active substances.

If it is assumed that the active substances, hereafter designated A and B, react with water forming two substances designated C and D, the following formula for the reaction of the reagent with water is obtained:

$$A+B+H_2O=C+D \qquad (1)$$

The statements made below are not limited to the case that the substances formed in reaction 1 are two in number, nor to the case that the coefficients for all substances are taken as 1, these assumptions being made in Formula 1 merely for the sake of simplicity.

In the absence of water, the active substances are assumed to react with a third substance which is designated K and which may consist of the solvent, or any of the substances added to facilitate the reaction of the reagent with water. It is assumed that two new substances M and N are hereby formed. The schematic formula for the reaction which takes place in the reagent in the absence of water and which gives rise to the spontaneous decrease in titre will therefore be:

$$A+B+K=M+N \qquad (2)$$

It must not be regarded as a limitation of the invention that the active substances according to Formula 2 are assumed to react with only one substance, nor that the number of substances formed in this reaction is assumed to be two or that the coefficients for all substances are taken as 1; these assumptions have also been made solely for the sake of simplicity. It should be pointed out, in addition, that one or more of the substances (M and N) formed in the reaction 2 may be identical to one or more of the substances (C and D) formed by the reaction 1 without thereby affecting the validity of the following statements.

In the course of the investigations which have formed the basis of the present invention, it has been found that it is possible to reduce the rate with which the spontaneous decrease of the titre proceeds by adding one or more additional substances to the reagent. Amongst the substances that have proved to be effective in this respect, the substances M and N which are formed as reaction products in the reaction 2 are primarily noted. Other substances, the character and composition of which are analogous to these substances, have also proved to exert a similar effect. The reduction of the rate of decrease of the titre which is obtained for a certain addition of said substances has proved to be dependent on the concentrations of the added substances. By giving the concentrations of the added substances suitable values in the reagent it has proved possible to reduce the rate of decrease of the titre to zero, that is to say, to cause the decrease of the titre to cease entirely. Under these conditions the reagent will assume a constant titre whose value does not change in the course of time. The concentration of the added substances necessary to obtain this result has been found to be dependent upon the nature of the added substances themselves and upon the concentrations of the active substances, as well as upon several other factors such as the type of solvent, the nature and concentration of the substances added to facilitate the reaction with water, etc.

The results just described appear to have the following explanation. From the experimental investigation it is concluded that reaction 2 is reversible. On adding the substances M and N to the reagent a reaction is caused to proceed from right to left in the Formula 2, that is to say, in the opposite direction to the reaction which takes place spontaneously in the reagent. The reaction thus produced by the addition of M and N counteracts the consumption of the active substances which causes the titre to decrease. As a consequence of this, the decrease in the titre of the reagent proceeds at a lower rate in the presence of M and N than if these substances are not present. As the rate of the reaction proceeding from right to left increases with increasing concentrations of M and N, the rate with which the titre decreases is gradually diminished when the concentrations of the added substances are increased. For certain values of the concentrations of M and N the reaction from right to left finally attains the same rate as the reaction from left to right. Under these conditions equally large amounts of the active substances are formed in a given period of time as are consumed by the reaction proceeding in the opposite direction. A state of equilibrium will then exist in the reagent with respect to the substances included in Formula 2. Since the system will have no tendency to change in either direction the titre of the reagent will remain constant and will not change in the course of time.

Between the concentrations present in the reagent at equilibrium the following relation will exist:

$$\frac{(M) \times (N)}{(A) \times (B) \times (C)} = \text{constant} \qquad (3)$$

where the concentration of each substance has to be raised to the exponent given by the coefficient for that substance in Formula 2, while constant of Equation 3 represents the equilibrium constant of reaction 2. By means of Equation 3 it is possible, in principle, to calculate the concentrations of M and N that are required for every value of concentrations of A and B in order to obtain a constant titre of the reagent. In practice, however, calculations of this kind are affected with considerable uncertainty, partly because the equilibrium constant depends to some extent upon the kind of the solvent, the activity conditions in the reagent etc., and partly because the circumstances causing the decrease in titre are sometimes more complicated than has been assumed above and might be characterized by several parallel reactions taking place concomitantly to each other in the reagent. In most cases, therefore, the required concentrations of M and N have to be determined by practical experiments.

What has been said above does not actually explain the fact that the decrease of the titre can be arrested also by other substances than those formed in reaction 2. In such cases reactions similar to those that proceed from right to left in Formula 2 have to be assumed, these reactions, instead of by M and N, being induced by the substances added in these specific cases. The analogy between the substances thus added and the substances M and N probably favours the production of such reactions. It is thus seen that these conditions can also be explained in analogy with what has been said above.

The additional substances added to the reagent in accordance with the invention serve the sole purpose of preventing the spontaneous decrease of the titre but they must not exert any unfavourable influence on the reaction of the reagent with water. This must be borne in mind in selecting the substances concerned and has to be investigated in each case. In the cases so far examined it has proved possible to eliminate the decrease in titre without any adverse effect upon the reagent's reaction with water. This has been found to be the case even when the added substances are partly or entirely identical with the substances C and D formed in reaction 1.

It will now be shown how a stable reagent for determining water is prepared according to the present invention, starting with the ordinary Karl Fischer reagent. The spontaneous decrease in titre that occurs in the Karl Fischer reagent has proved to be due to the reaction taking place between sulphur dioxide, iodine and methanol in the absence of water which produces, amongst others, iodide ions. According to the present invention the decrease in titre occurring in the Karl Fischer reagent is eliminated by adding to the reagent a suitable concentration of substances of the kind formed in this reaction, preferably iodide ions. The required iodide ion concentration may hereby be obtained in various ways. Thus, in the first place a suitable quantity of a solid salt, whose anions consist of iodide ions may be added to the reagent. The cations of the added salt should be of such a nature that the salt can be dissolved in the reagent in the necessary concentration, at the same time as the cations must not exercise any disturbing influence upon the properties of the reagent. Nor must any compounds which are difficultly soluble or exert a disturbing effect be produced by the reactions of the cations with the constituents of the reagent, or with the substances formed by the reaction of the reagent with water, or with any substances with which the reagent may come into contact during its storage or use. Amongst other substances, pyridiniumhydroiodide has proved to possess favourable properties in the respects just mentioned. Instead of adding the iodide ions directly to the reagent a substance may also be added which forms iodide ions with the constituents of the reagent. Since iodide ions are formed in the reaction of the reagent with water, the desired iodide ion concentration can be produced for example, by the addition of water. The quantity of water added is hereby adjusted so that it produces the desired iodide ion concentration transforming a certain part of the iodine present to iodide ions. Other methods may also be employed for obtaining the required concentration of iodide ions. Finally, it may be mentioned that other substances than iodide ions when added in suitable concentrations are capable of arresting the decrease of the titre.

With given values of the concentrations of sulphur dioxide, methanol and pyridine, the titre of the reagent will be proportional, with some approximation, to the concentration of free iodine present in the reagent. Provided that the concentrations of the other constituents are constant, it has been found that the iodide ion concentration required to give the reagent a constant titre is approximately determined by the iodine concentration in accordance with the formula:

$$\left(\frac{I^-}{I_2}\right) = \text{constant} \qquad (4)$$

Giving the concentrations in mols/litre, the constant in Equation 4 is found to possess the value 3.2 when the concentrations of sulphur dioxide and pyridine are 1.2 and 3.5 mols/litre, respectively.

As more specific examples of the application of the invention the following prescriptions for preparing two stable Karl Fischer reagents may be given. In case of one of the reagents pyridiniumhydroiodide is used, in the other case water is added to obtain the desired stability. The conditions have been so chosen that the titre of the reagents and their composition in other respects as closely as possible correspond to those of the previously customary Karl Fischer reagents (see Mitchell & Smith, Aquametry, New York 1948, page 19 ff.).

1. For the preparation of 1 litre of the reagent 84 g. iodine, 85 g. sulphur dioxide, 308 g. pyridine and 690 ml. methanol are mixed together. This reagent has the titre of 3.6 mg. H₂O per ml. In order to prevent a change of the titre in the course of time, 70 g. anhydrous pyridiniumhydroiodide is added. This produces a molar ratio of iodide concentration ($I^-$) to iodine concentration ($I_2$) of about 3 to 1. The titre of 3.6 mg. $H_2O$ per ml. will then remain constant and not change with time.

2. For preparing 1 litre of the reagent 132 g. iodine, 97 g. sulphur dioxide, 355 g. pyridine and 550 ml. methanol are mixed together. This reagent has the titre of 6.0 mg. $H_2O$ per ml. In order to obtain the desired constancy of the titre 2.4 g. water is added. This produces a molar ratio of iodide concentration ($I^-$) to iodine concentration ($I_2$) of about 3 to 1. The titre of 3.6 mg. $H_2O$ per ml. of the reagent will then remain constant and not change in the course of time.

The accompanying drawing is a diagram which shows the stability of two different reagents for determining water. The curve $a$ in said diagram shows the change of the titre which takes place with time in case of an ordinary reagent; the curve $b$ shows the corresponding conditions in case of a reagent prepared in accordance with the present invention. Whereas the titre of the first reagent decreases by several tens of per cent per month, the change occurring in the second reagent during the same period of time amounts to 1% or less.

In order to reduce the decrease in titre that takes place in an ordinary Karl Fischer reagent during the time which elapses from the preparation of the reagent and until it is used, it has earlier in some cases been practiced to prepare the reagent from two separate solutions which were mixed shortly before the intended use. By choosing the composition of said solutions so that each solution does only contain components which do not react with one another the solutions can be stored for an unlimited time without suffering any decrease in the concentration of the active substances. As a rule the one solution (I) contains sulphur dioxide, methanol and pyridine whereas the other solution (II) contains iodine and methanol. Although the main reason for this procedure is no longer at hand after the appearance of the present invention it may still in some cases be suitable to prepare the definite reagent by combining two solutions. According to the present invention, one or both of said solutions should hereby contain iodide ions in such a concentration that the iodide ion concentration in the reagent obtained by their combination assumes the value necessary to give the reagent a constant titre. As an alternative it is possible in connection with the preparation of the reagent to add iodide ions from one or more other sources so that the necessary iodide ion concentration is obtained. A reagent thus produced presents the advantage that its titre does not change with time, whereas the reagents earlier produced by combining two solutions undergo a progressive decrease in titre which starts as soon as the two solutions are brought together.

According to another method earlier practiced the two solutions (I and II) are not combined into a single reagent before use, but are applied instead as separate titrating solutions. According to this method a certain quantity of solution (I) together with an excess of solution (II) is usually added to the sample whose water content is to be determined. After the water content of the sample has been extracted by the active constituents of the added solutions, the remaining excess of solution (II) is titrated back with solution (I). Before the final titration is carried out, the solution obtained by the combination of the sample with solutions (I) and (II) contains the active substances in the presence of one another. A reaction will thus take place in said solution between the active substances, in analogy with the corresponding reaction which occurs in the anhydrous reagent. As a consequence hereof, the result of the final titration will be too low and an error will arise in the value of the water content of the sample. According to the present invention this error is eliminated by imparting such an iodide ion concentration to the solution obtained by combining the sample with the two titrating solutions that the reaction between the active substances in said solution (which would otherwise take place in the solution) is substantially prevented. The iodide ion concentration necessary for this purpose may either be derived from corresponding iodide ion concentrations in one or both of the solutions (I) and (II) or it can be obtained by adding a suitable quantity of iodide ions from one or more other sources before or in connection with the addition of solutions (I) and (II).

It may be understood that the present invention is not limited to the methods for its performing which are described here but also covers all applications and methods which can be included within the scope of the inventive principle.

What we claim is:

1. A stabilized Karl Fischer reagent for the determination of water comprising, dissolved in a conventional solvent, sulfur dioxide, pyridine and free iodine, and also containing iodide ions in amount sufficient to satisfy the equation:

$$\left(\frac{I^-}{I_2}\right) = \text{const.}$$

wherein ($I^-$) and ($I_2$) represent, respectively, the molar concentrations of iodide ion and of free iodine present in said reagent and wherein said constant has the value of about 3.2 when the solvent consists of methanol and when the concentrations of sulfur dioxide and of pyridine in said reagent are about 1.2 moles per liter and about 3.5 moles per liter, respectively, said reagent having a stable titre due to the presence therein of said iodide ion concentration.

2. The stabilized Karl Fischer reagent of claim 1 wherein the reagent contains dissolved therein pyridiniumhydroiodide in amount sufficient to produce the iodide ion concentration defined in the claim.

3. The stabilized Karl Fisher reagent of claim 1 wherein the conventional solvent is methanol.

References Cited in the file of this patent

Chem. Weekblad, 47, 608–9 (1951), by J. H. Van der Meulen.